United States Patent [19]

Maust

[11] 4,274,505
[45] Jun. 23, 1981

[54] HYDROSTATIC-DRIVE TRACTOR

[76] Inventor: Gale E. Maust, 8669 Pigeon Rd., Bay Port, Mich. 48720

[21] Appl. No.: 942,927

[22] Filed: Sep. 18, 1978

[51] Int. Cl.³ .............................................. B60K 5/00
[52] U.S. Cl. .................................... 180/215; 60/487; 180/54 E; 180/292
[58] Field of Search ................. 60/455, 456, 465, 487, 60/307, DIG. 5, 6.2, DIG. 10, 6.48; 180/54 R, 54 A, 54 E, 56, 58, 305, 68 R, 210, 215, 54F, 55, 62, 61, 63, 291, 292, 75, 70 R, 218, 216

[56] References Cited

U.S. PATENT DOCUMENTS

| | | | |
|---|---|---|---|
| 2,327,848 | 8/1943 | Schroeder | 180/54 E |
| 3,208,222 | 9/1965 | Wilmes | 60/465 |
| 3,581,498 | 6/1971 | Cudnohufsky | 60/468 |
| 3,727,712 | 4/1973 | Colloton | 180/305 |
| 3,863,449 | 2/1975 | White | 60/456 |

*Primary Examiner*—John J. Love
*Assistant Examiner*—Randall A. Schrecengost

*Attorney, Agent, or Firm*—Gordon W. Hueschen

[57] ABSTRACT

A narrow gauge, hydrostatic-drive tractor comprises an air-cooled prime mover, a Sundstrand hydraulic transmission mechanically coupled thereto, a fixed-displacement hydraulic motor hydraulically coupled to the Sundstrand transmission, an air conduit extending vertically upward from the fan housing of the prime mover for supplying ambient air to cool the prime mover, and cooling device disposed in the air conduit functioning to cool the hydraulic fluid. The motor is disposed beneath the fan housing and is coupled through a differential to drive wheels which, advantageously, have a diameter substantially the same as the width of the tractor. Advantageously, also, a manually-operated selector valve and a pressure-actuated cross-over relief valve is provided for by-passing the motor to protect the motor and to permit the tractor to be moved manually. There is also disclosed a scraping device for use with the above or like narrow gauge tractor.

20 Claims, 10 Drawing Figures

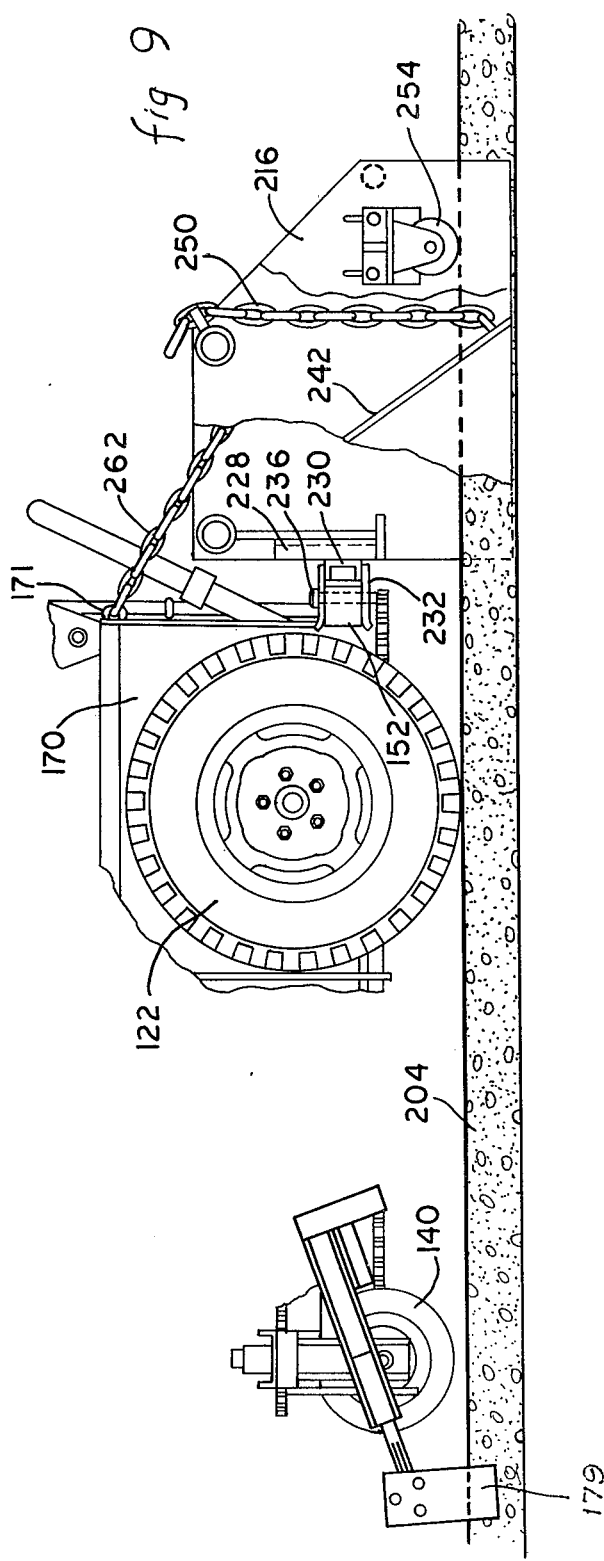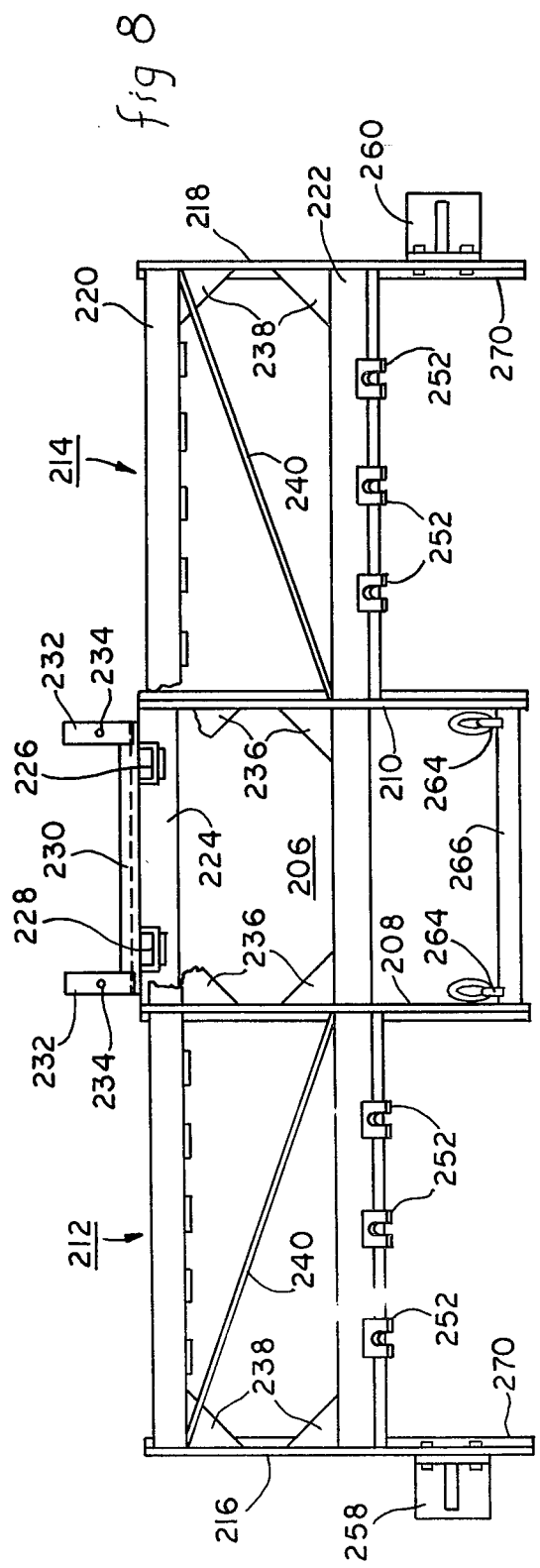

HYDROSTATIC-DRIVE TRACTOR

FIELD OF INVENTION AND PRIOR ART

The invention relates to a narrow gauge hydrostatic-drive tractor utilizing a prime mover, a hydraulic transmission, and a hydraulic motor.

Tractors involving a prime mover, a hydraulic transmission and a hydraulic motor are known in the art but have the disadvantage that they are wide and difficult to operate and control for certain purposes.

For example, tractors of the class described have not been entirely suitable for use in chicken houses for removing droppings. Ideally, such housings are arranged so that the droppings fall into troughs on each side of a narrow concrete walkway. It is desirable to have a tractor capable of operating on this way with a tool holder at one end adapted to hold scrapers and like tools for moving droppings along the troughs to the end of the chicken house. None of the tractors heretofore available have been entirely satisfactory for this purpose.

OBJECTS OF THE INVENTION

It is an object of the invention to provide an improved narrow gauge hydrostatic-drive tractor. It is an object of the invention to provide such a device which is rugged and efficient. It is a further object of the invention to provide such a device having effective means for cooling the hydraulic fluid. It is a further object of the invention to provide such a device having the advantages of a fixed-displacement motor without the disadvantages thereof. It is a further object of the invention to provide such a device with sufficient traction to handle heavy loads. Further objects of the invention are to avoid the disadvantages of the prior art and to obtain such advantages as will appear as the description proceeds.

BRIEF DESCRIPTION OF THE INVENTION

The invention relates to a narrow gauge, hydrostatic-drive tractor comprising an air-cooled prime mover having a drive shaft, a variable-displacement, reversible hydraulic pump having a driven shaft coupled with the drive shaft of the prime mover by direct mechanical coupling, a fixed-displacement hydraulic motor having a drive shaft and being hydraulically coupled to the pump by means of a hydraulic circuit in which the output of the pump is supplied directly to the input of the motor and the output of the motor is supplied directly to the input of the pump, a fan and fan housing at the end of the prime mover opposite the drive shaft, an air conduit means extending vertically upward from the fan housing for supplying ambient air to cool the prime mover, cooling means disposed in the air conduit means in heat-exchange with the ambient air drawn in, with the cooling means functioning to cool the hydraulic fluid in the hydraulic circuit, and differential means having transverse axles and a driven shaft, and wheels connected to the axles, said motor being disposed beneath the fan housing with its drive shaft projecting beyond the housing and beneath the driven shaft of the differential and mechanically coupled thereto.

Advantageously, the hydraulic circuit is kept charged by a charge pump circuit comprising a charge pump driven by the prime mover and having input and output ports in which the output flows in a closed cycle back to the charge pump through the cooling means and in which the closed cycle communicates with the hydraulic circuit by means of check-valve means which permits flow of hydraulic fluid into the hydraulic circuit as required to compensate for the loss of hydraulic fluid through leakage, and in which supply means are provided to furnish make-up hydraulic fluid to the closed cycle. Advantageously, the supply means comprises means for bleeding leakage from the hydraulic circuit into the closed cycle. It also preferably includes a reservoir. Preferably, the output of the charge pump flows through the cooler and then into the reservoir and then to the input of the charge pump. Also, it is of advantage to provide a by-pass valve means arranged so that the output of the charge pump by-passes the cooler to the reservoir when the output pressure of the charge pump exceeds a set value.

Advantageously, the hydraulic circuit comprises pressure-actuated, cross-over relief valve means arranged to by-pass hydraulic fluid by the motor when the pressure in the hydraulic circuit exceeds a certain value. This makes it possible to use a fixed-displacement hydraulic motor without danger of damage thereto if the pressure in the hydraulic circuit becomes excessive due to a heavy load or an obstacle preventing forward motion of the tractor. Advantageously, the cross-over relief valve means comprises two one-way valves, one of which is pressure-actuated when the flow of fluid in the hydraulic circuit is in one direction and the other of which is pressure-actuated when the flow is in the opposite direction.

It is of advantage also to provide a manually-controlled by-pass for the motor so that the tractor can be manually moved. When such a by-pass is open and the tractor is manually moved, the motor functions as a pump, the output of which flows back to the motor. When the by-pass is closed, the hydraulic circuit also is closed, so that the motor cannot move except in response to the variable-displacement pump.

Advantageously, the prime mover, the pump, and the motor are supported by a frame which comprises longitudinal parallel beams, the front ends of which are supported in and form a unitary part of the housing of the differential and the rear ends of which are supported by a vertically-trunnioned idler-wheel assembly adapted to rotate about its vertical axis to steer the tractor. It is of advantage also to have the diameter of the drive wheels substantially the same as the spacing from the outside of one wheel to the outside of the other wheel. Advantageously, the wheels are separated from each other by less than two widths of the wheels. It is of advantage also for the frame to carry a superstructure which extends up over the wheels supporting an operator's seat.

The air conduit means, conveniently, is disposed between the two wheels and between the seat and the prime mover. Also, it is of advantage if the overall width of the tractor is not substantially greater than the diameter of the wheels. By these features, a narrow, rugged tractor is provided in which the wheels are sufficiently large and have a sufficiently large base to provide adequate traction for moving heavy loads.

It is of advantage to provide a vertical steering column adjacent the seat and to connect it to the guide wheel by a roller-chain drive. Advantageously, two such chains are used, one of which connects the steering column with a sprocket at the bottom of a vertically-disposed trunnion, and the other of which connects the guide wheel to a sprocket at the top of the vertically-disposed trunnion. It is of advantage to have the first chain disposed along the bottom of one side of the frame running from the bottom sprocket on the vertical trunnion to and around a plurality of front end sprockets, one of which is unitary with the steering column. Preferably, the front end sprockets are mounted on the bottom of a transverse bumper or other support affixed to the bottom of the forward portion of the superstructure or frame and, preferably, comprises two direct sprockets and two idler sprockets. The direct sprockets are those which operate on the same side of the chain as the bottom sprocket on the vertical trunnion and the idler sprockets are those which operate on the opposite side of the chain. Advantageously, the sprocket which is unitary with the steering column is an idler sprocket. It is desirable to provide means for tightening the first chain about the sprockets which, advantageously, can be a turnbuckle in the chain or means for moving one of the direct or idler sprockets.

In the preferred form of the invention the tractor is provided with a transverse guide holder rearward of the guide wheel which, advantageously, is affixed to arms pivotally mounted on a transverse trunnion journaled in the frame forward of the idler wheel. This tool holder can be raised or lowered by causing the arms to rotate about the trunnion. This, advantageously, is accomplished by means of the bell crank arrangement unitary with one of the arms connected to a control lever adjacent the seat.

The invention also relates to improvements in scraping means for use in conjunction with a narrow gauge tractor, such as described above, adapted to run on a narrow walkway between parallel troughs, which scraping means is complementary with said troughs, so that when the tractor is driven down the walkway with the scrapers in the troughs, material in the troughs is pushed along toward the ends of the troughs.

In particular, the invention relates to a combination with a narrow gauge tractor of the class described which has drive wheels at the front end and idler wheel means at the rear end, so arranged that the entire weight of the tractor is supported by the drive wheels and the idler wheel means, with the scraper means located adjacent to and in front of the drive wheels, together with connecting means for connecting the scraping means to the front end of the tractor, so arranged that when the scrapers are loaded, the weight of the material therein will cause the idler wheel means to be lifted off the walkway so that the entire weight of the tractor rests on the drive wheels, and guide means adjacent the rear end of the tractor for guiding it along said walkway when the idler wheel means is off the walkway.

By this combination, it is possible to obtain the most efficient traction between the drive wheels and the walkway so that heavy loads of material can be handled.

Advantageously, the scraping means has a hinged scraping blade so that, when the tractor is backed up, the blade will ride up over any material still left in the trough and, when it is moved forward again, the blade will again be in material-engaging position. Also, it is of advantage to provide limiting means, for example, rollers, adapted to roll on the sides of the troughs to limit the extent to which the scraping means enters into the troughs. It is also of advantage to provide adjusting means for adjusting the extent to which the scraper blades can swing downwardly about the hinges.

In the preferred form of the invention, the scraping means comprises a central portion having depending sides adapted to straddle the walkway and front portions having depending sides adapted to fit down into the troughs. Advantageously, the central portion of the side portions have common depending sides. Also, advantageously, the depending sides depend from parallel transverse tubular members. In such case, it is of advantage to have the scraper blade hinged to the rear transverse tubular member. Also, it is of advantage to have the adjusting means made of chains affixed to the front end of the scraper blades and adapted to be held in slots fastened or affixed to the forward tubular member. The slots are arranged so that one link of the chain can go in sideways, but not crosswise, so that the chain can be raised or lowered link by link.

BRIEF DESCRIPTION OF THE DRAWINGS

In the drawings:

FIG. 8 is a plan view of FIG. 7.

FIG. 9 is a side elevation with parts broken away of a tractor scraper and guide assembly.

DETAILED DESCRIPTION OF THE INVENTION

Figure 1:
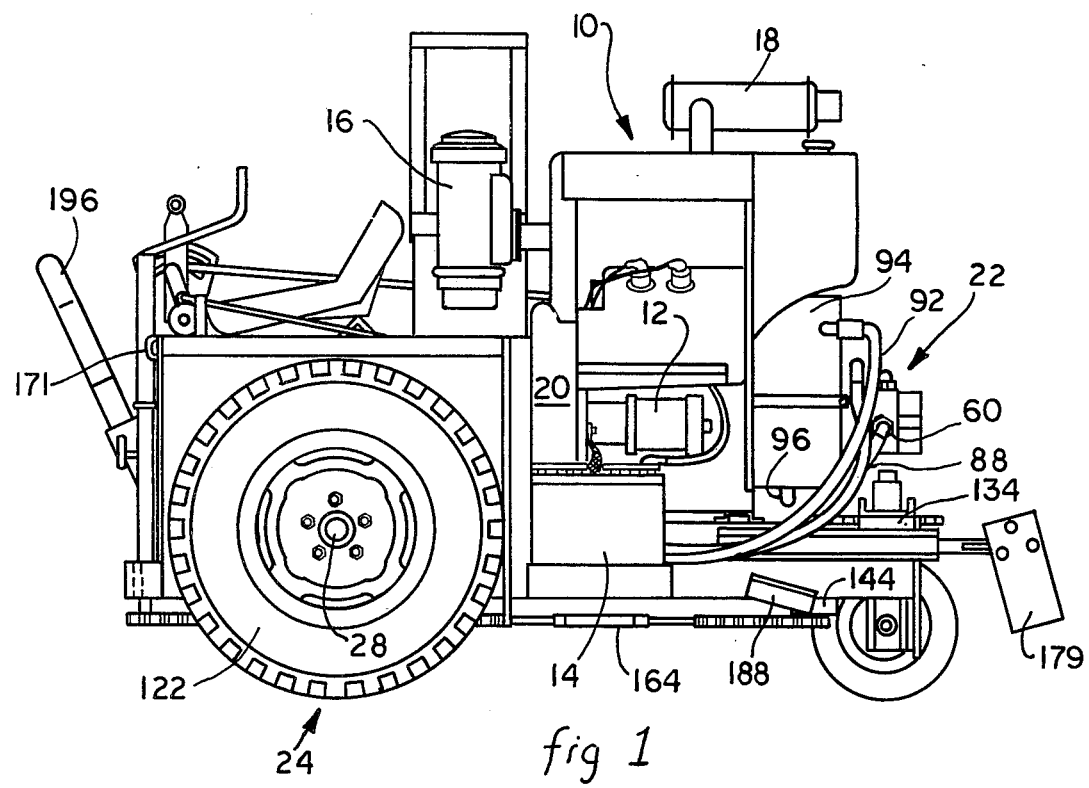
FIG. 1 is a side elevation taken along line 1—1 of FIG. 2.
Figure 4:
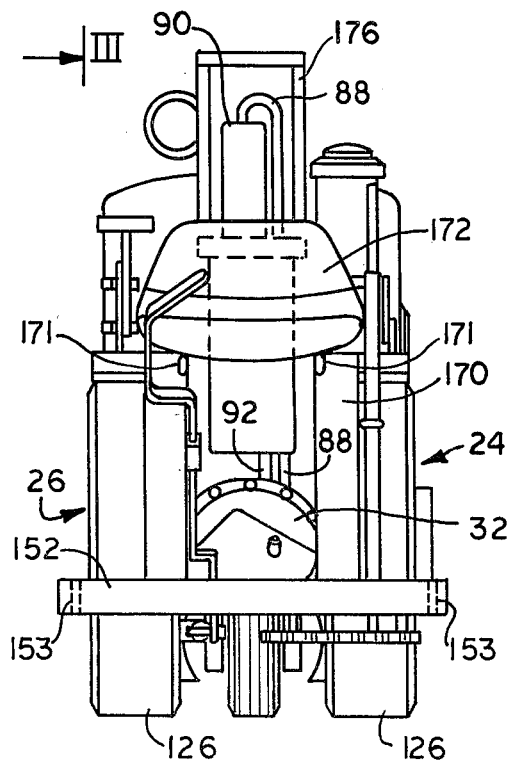
FIG. 4 is a front elevation.
Figure 2:
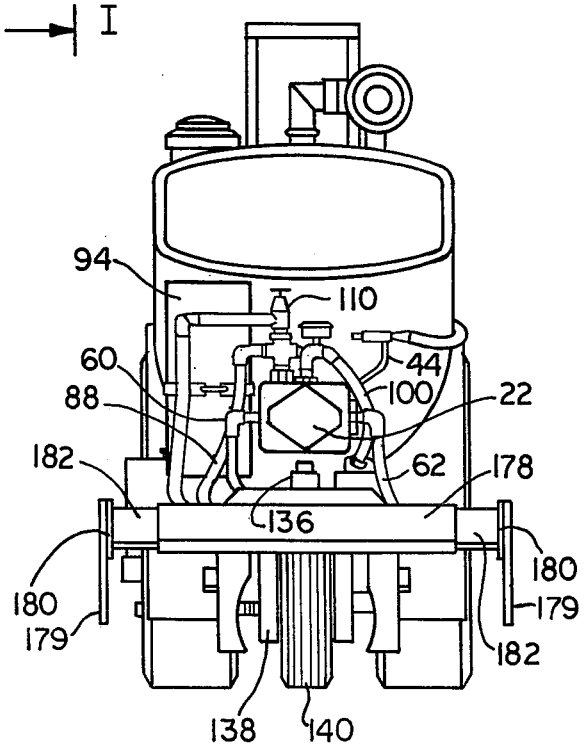
FIG. 2 is a rear elevation.
Figure 5:
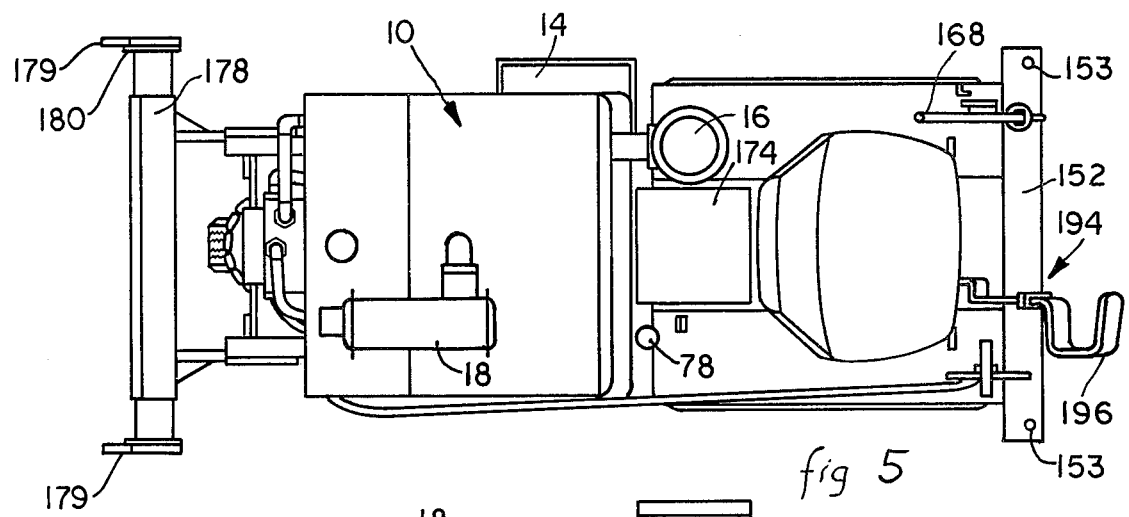
FIG. 5 is a plan view.
Figure 3:
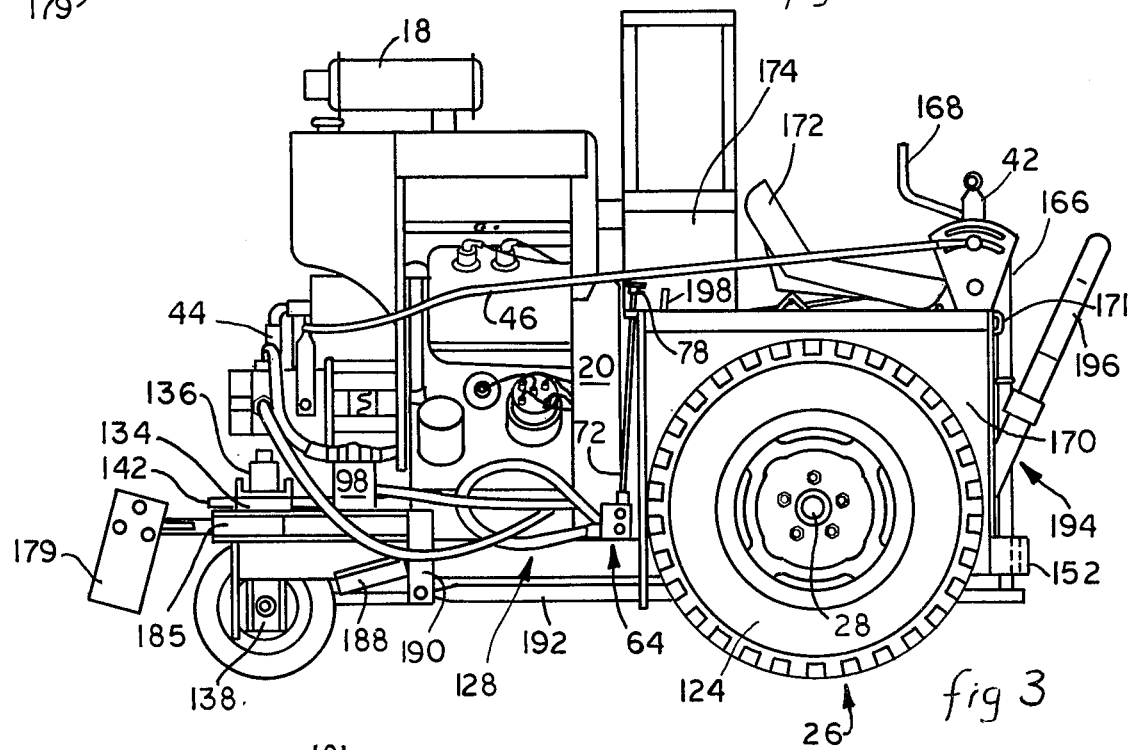
FIG. 3 is a side elevation taken along line 3—3 of FIG. 4.
Figure 6:
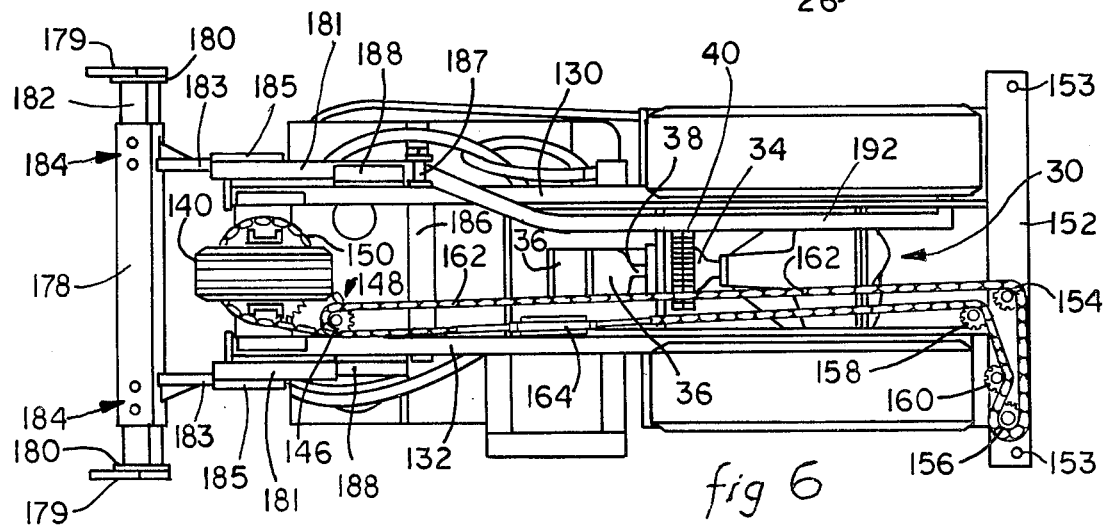
FIG. 6 is a bottom view.
Figure 7:
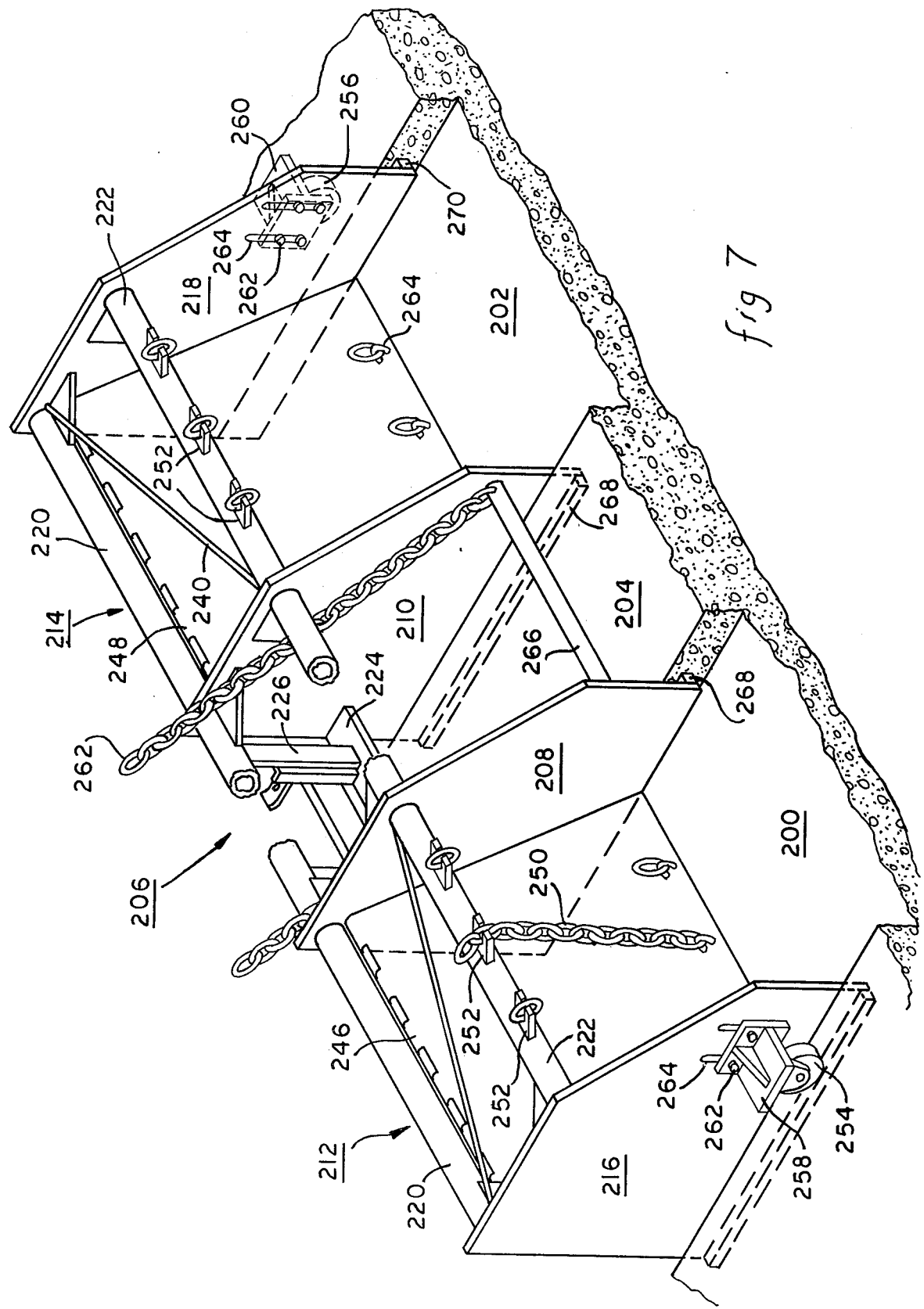
FIG. 7 is an isometric view of the scraping means.

Referring now particularly to FIGS. 1 through 10, there is shown a tractor according to the invention comprising an air-cooled gasoline engine 10 having the usual appurtenances, such as, starter 12, battery 14, air cleaner 16, muffler 18, fan housing 20, and such other appurtenances as are commonly found on an air-cooled gasoline engine.

The drive shaft (not showns) of the gasoline engine 10 projects rearwardly and is directly and mechanically connected with the hydraulic transmission 22 which, suitably, is of the Sundstrand type.

The tractor is driven by two large wheels 24 and 26 fastened to the axles 28 of a differential 30 having a housing 32 and a driven shaft 34. The driven shaft 34 extends rearwardly to a point adjacent the fan housing 20 of the engine 10 and is connected to the hydraulic motor 36 disposed underneath the engine 10 with its drive shaft 38 projecting out beyond the fan housing 20 and parallel to and underneath the driven shaft 34 of the differential 30. The drive shaft 38 is connected to the driven shaft 34 by a chain drive 40.

The hydraulic transmission 22 is controlled by the lever 42 connected to the transmission control lever 44 by connecting rod 46. Movement of the lever 42 is effective to control the amount of displacement and the direction of flow and the hydraulic transmission is connected to the motor as shown in FIG. 10.

Figure 10:
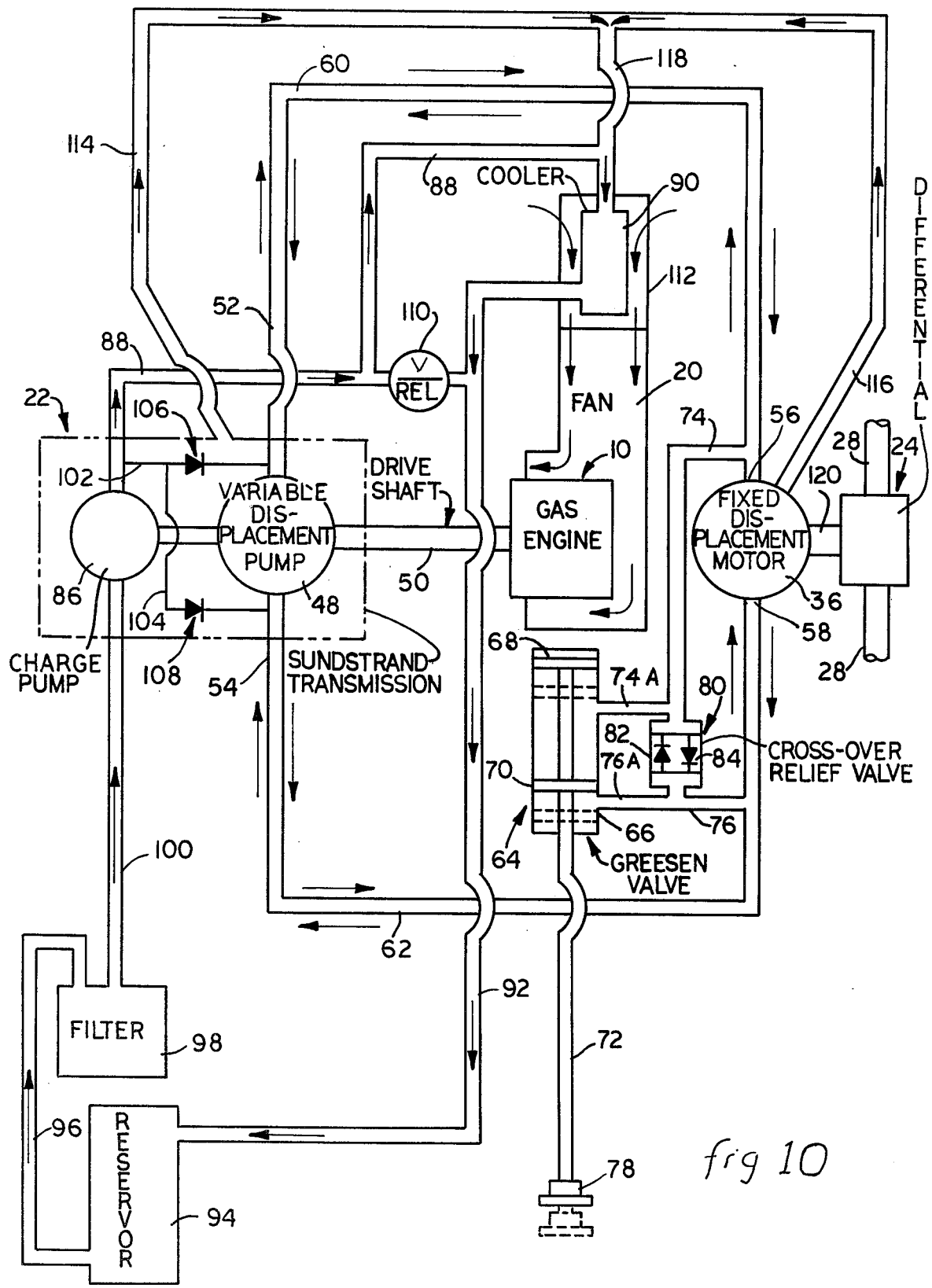
FIG. 10 is a schematic view showing general arrangement of parts and flow diagrams.

Referring now to FIG. 10, it will be seen that the Sundstrand transmission comprises a variable-displacement pump 48 which is directly connected to the gas engine 10 by drive shaft 50. The variable-displacement pump 48 has input-output ports 52 and 54 which, depending on how the pump is set, delivers hydraulic fluid in the direction shown by the arrows. The hydraulic motor 36 also has ports 56 and 58 which function as input or output ports according to the direction of flow.

The pump 48 is connected to the motor 36 directly by flow lines 60 and 62 which form, with the pump and the motor, a hydraulic circuit, so that hydraulic fluid flows directly from the pump 48 to the motor 36 and directly back to the pump.

The pump 48 is a variable-displacement pump in which the output is controlled by the setting of the control lever 44. The motor 36 is a fixed-displacement motor with the result that the speed of the motor is variable according to the setting of the variable-displacement pump 48.

When the control lever 44 is set in the neutral position, that means that there is no flow in lines 60 and 62 and the motor does not turn. However, in this condition, the tractor becomes immobile and cannot be mechanically moved. For this reason, there is provided a mechanically-actuated by-pass valve 64 which, suitably, is the Greesen-type selector valve. The selector valve 64 comprises a cylinder 66 having a double piston 68-70 on the manually-operated piston rod 72. The cylinder 66 is connected to the flow line 60 by by-pass line 74, and flow line 62 by by-pass line 76. When the double piston 68-70 is in the position shown, flow of hydraulic fluid in by-pass line 74A and 76A is blocked. However, when piston rod 72 is moved to the position shown in dotted lines by the handle 78 and the double piston 68-70 assumes the position shown in the dotted lines, flow from by-pass line 74 to and from by-pass line 76, or vice versa, is made possible. This provides for flow of hydraulic fluid from flow line 60 to flow line 62 or vice versa, so that the motor can be disconnected from the variable-displacement pump. Thus, a neutral condition can be obtained by the use of the manually-operated Greesen selector valve 64, so that the variable-displacement pump does not affect the motor. Or, if the variable-displacement pump 48 is set at neutral, the motor is still not connected with the pump, so that the tractor can be pushed manually during which the fixed-displacement motor 36 acts as a pump to pump hydraulic fluid to line 74 and 74A or 76 and 76A through the cylinder 66, through line 74 and 74A or 76 and 76A (depending on the direction) and back to the motor 36, and vice versa.

In order to protect the fixed-displacement motor 36, there is provided in the by-pass circuit, a cross-over relief valve 80, which is pressure-actuated when the pressure in line 60 or 62 becomes excessive. The cross-over relief valve 80 comprises two pressure-actuated check valves 82 and 84. Thus, the pressure-actuated check valve 82 permits flow from by-pass line 76 into by-pass line 74 and the corresponding valve 84 permits flow in the opposite direction. This has particular advantage in combination with a fixed-displacement motor, because of the possibility of the tractor becoming stalled with the result that excessively high pressure which could damage the motor 36 could develop in lines 60 and 62.

To compensate for leakage in the pump 48 and motor 36, there is provided a charge pump 86 which, suitably, is a small gear pump which is adapted to pump hydraulic fluid in a closed circuit. In the modification shown, the closed circuit comprises the output line 88 which leads to cooler 90 which, in turn, leads through line 92 to reservoir 94 which, in turn, leads through line 96 to filter 98 from which the hydraulic fluid is returned to the charge pump through the input line 100.

Connected to the output line 88 are charge lines 102 and 104. These charge lines communicate, respectively, with lines 60 and 62 through one-way check valves 106 and 108. When the pressure in lines 60 and 62 becomes too low, that is, below the set value, the check valves 106 and 108 open to allow replacement fluid to flow into the hydraulic circuit comprising the pump 48, motor 36, and flow lines 60 and 62. Also, a pressure-relief valve 110 is provided to pass hydraulic fluid from the closed circuit of the charge pump to the reservoir 94 and by-pass the cooler 90.

The cooler 90 is disposed in the upper portion of an air intake conduit 112 communicating with the fan housing 20, so that the ambient air which is drawn in to cool the gas engine 10 also cools the hydraulic fluid in the system.

Make-up of hydraulic fluid for that loss can be provided by charging additional fluid into the reservoir. Also, leakage lines 114 and 116, respectively, from the pump 48 and the motor 36 gather leaked fluid and return it to the system through the cooler 90 via the line 118.

The fixed-displacement motor is mechanically connected to the differential 30 by the chain drive 40.

Thus, operation of the gasoline engine drives the variable-displacement pump 48 which, in turn, drives the fixed-displacement motor 36 which, in turn, drives the differential, which differential 30, through the axles 28, is connected to the wheels 24 and 26.

The wheels 24 and 26 comprise large tires 122 and 124 which have relatively large tread surfaces 126 to provide the desired traction. The wheels 24 and 26 are spaced apart such that the space between the wheel is not greater than two tread widths. Also, the diameter of the wheels 24 and 26, including the tires thereon, is such that the overall width of the tractor is not substantially greater than the diameter of the wheels. This makes for a narrow, compact tractor with large wheels having a wide-traction surface.

The gas engine 10, the hydraulic transmission 22, and the motor 36 are supported on a frame 128 comprised of two parallel beams 130 and 132 which are supported by the differential housing 32, united therewith as an integral part thereof. The rear end of the frame 128 is supported by a transverse member 134 in which is journaled a vertical trunnion 136 connected to a fork 138 in which is journaled the guide wheel 140. Thus, the idler wheel 140 is adapted to be turned on a vertical axis to provide for steering of the tractor.

Mounted on the trunnion 136 is sprocket 142 and mounted on the beam 132 is a vertical trunnion 144 having a bottom sprocket 146 and a top sprocket 148 which is connected to the sprocket 142 by a roller chain 150. The top sprocket 148 and the bottom sprocket 146 rotate as a unit. At the front end of the tractor is a bumper 152 having clevis pin holes 153 therein. To the bottom of this bumper is attached a plurality of sprockets adapted to cooperate with the bottom sprocket 146 to provide control of the idler wheel 140. These sprockets comprise direct sprockets 154 and 156 and idler or indirect sprockets 158 and 160. A roller chain 162 goes over sprockets 146, 154, and 156 and under sprockets 158 and 160. The chain is provided with a turnbuckle 164 for tightening the same. One of the sprockets at the front end, suitably, the idler or indirect sprocket 160 is affixed to the bottom of the vertical steering column 166, provided with a handle 168 or other means for rotating the steering column 166. Thus, when the steering column 166 is rotated, movement is imparted to the idler wheel 140, so that the direction of the tractor can be controlled and varied.

Between the wheels 24 and 26 and supported on the frame 128 is a superstructure 170 adapted to support an operator's seat 172 above the wheels 24 and 26.

Between the wheels 24 and 26 and between the seat 172 and the engine 10, there is provided a vertically-disposed air conduit 174 which communicates with the fan housing 20 so that ambient air for cooling the engine 10 is drawn in through the air conduit 174. The air conduit 174 is disposed between the wheels 24 and 26 and between the seat 172 and the engine 10, and extends down to a position just above the chain drive 40 and the housing 32 of the differential.

Disposed in the intake portion of the air conduit 174 is the cooler 90. Oil is supplied to the cooler 90 through lines 88 and 92, as described in regard to FIG. 10. The upper part of the cooler 90 is protected by a frame 176 which, suitably, is closed in with screening to prevent large particles from entering the air stream.

At the rear end of the tractor there is provided a transverse guide holder 178 having adjustable guide holding means 180. The guide holding means 180 are mounted on tubes or bars 182 adapted to telescope into the guide holder 178. Suitable pin and pin holes 184 are provided for adjustment of the tubes 182 in or out. The guide holder 178 is adapted to hold vertical plates 179 or like guides adapted for maintaining the position of the tractor with respect to an elevated walkway located between the guides 180 and to enable the tractor to traverse the said walkway without falling off laterally.

The guide holder 178 is affixed to parallel arms 181 by means of rods 183 adapted to telescope in tubes 185 mounted on the arms 181. The arms 181 are journaled to the beams 130 and 132 by a trunnion 187 passing through a tube 186 welded between the beams 130 and 132. Thus, the tool holder 178 can be raised or lowered, according to the position of the arms 181. Stops 188 are provided to limit the downward motion of the arms 181. At the trunnion end of the arms 181 is a bell crank 190 which is connected by means of the connecting rod 192 to a foot lever 194 at the forward end of the tractor. Pushing the lever 194 forward will cause the tool holder 178 to be raised. Means, not shown, is provided for engaging the lever 194 to hold it in the raised position. The top part 196 of the lever 194 may be made removable and stored on lug 198.

At the other end of the tractor, i.e., the front, means are provided for mounting a scraping means adapted to be pushed along by the tractor in parallel troughs 200 and 202 on each side of a narrow walkway 204. The scraping means comprises a central portion 206 having depending sides 208 and 210 adapted to straddle the walkway 204, and side portions 212 and 214 also having depending sides 216 and 208 for side portion 212, and 218 and 210 for side portion 214. The side portions 212 and 214 extend down into the troughs 200 and 202. The depending sides 208, 210, 216, and 218 depend from parallel transverse tubular members 220 and 222, which form a cantilever-type bridge for supporting the side portions 212 and 214.

The central portion 206 has a transverse member 224 adjacent the rear which is parallel to the tubular member 220. Vertical channel bars 226 and 228 are welded between the transverse member 224 and the tubular member 220, to form a support for the tractor hitch. The tractor hitch comprises a transverse bar 230 having a clevis 232 at each end having clevis pin holes 234 therein. The clevises 232 are adapted to fit over the bumper 152 with the holes 234 in registry with the holes 153, so that the clevis pins 236 can be inserted to fasten the scraper means to the front end of the tractor.

The central portion 206 has triangular portions 236 welded in the corners between the depending sides 208 and 210 and the transverse tubular members 220 and 222. This is for the purpose of rigidity.

Similarly, the side portions 212 and 214 have triangular members 228 welded in the corners, as shown, plus a tie bar 240 to reinforce the side portions against the drag pulled on them by the material in the troughs.

The side portions 212 and 214 are provided with scraper blades 242 and 244 which are hinged at 246 and 248 to the transverse tubular member 220. To the front or forward ends of the scraper blades 242 and 244 are attached chains 250 which extend up to the transverse tubular member 222 where they are fastened in the slot connectors 252 which have a slot just wide enough to receive one link sideways, but not wide enough to receive the link crosswise. Thus, the height of the forward edge of the scraper blades 242 and 244 can be raised or lowered by removing the chain from the slot connector 252 and putting a different link therein.

On the outside of depending sides 216 and 218 are rollers 254 and 256 which are mounted in brackets 258 and 260 which are fastened to the sidewalls 216 and 218 by the adjustable bolt and slot connection 262-264. The roller is adapted to ride on the side of the troughs 200 and 202 and thus limit the extent to which the side portions 212 and 214 can enter into the trough. These rollers, coupled with the chains 250, make it possible to adjust the space between the bottom edge of the scraper blades 240 and 244 and the bottom of the trough 200 and 202. This is an important feature, as will be seen as the description proceeds.

The scraping means is fastened to the front end of the tractor by a truss, one element of which is the tractor, the other element of which is the scraping means, and the other element of which is chain 262. The chains 262 are connected between eyes 264 on a transverse bar 266 in the forward lower portion of the central portion 206 and eyes 171 at the top of the superstructure 170.

The length of chain 262 and the adjustment of chains 252 and the rollers 254 and 256 are such that, at rest, the forward edges of the scraper blades 242 and 244 are off the bottom of the troughs and the rollers 254 and 256 are off the side edges of the troughs. Thus, when the tractor is moved forward and a load of material impinges on the scraper blade, the combined vectors, of the weight of the material and the forwrd motion of the tractor, pull the scraping means down, so that the rollers 254 make contact with the sides of the troughs, with the result that the idler wheel 140 is lifted off the walkway 204, as shown in FIG. 9. At the same time, the guide plates 178 still remain in position, straddling the walkway 204, so that the tractor continues in a straight path down the walkway 204. This lifting of the idler wheel 140 off the walkway 204 shifts the whole weight of the tractor on the drive wheels 122 so that really effective traction is obtained. Also, the weight of the material accumulated in the scraper adds a further load to the drive wheels and thus further enhances the traction. Thus, the more the scraper digs in, the greater the traction.

Wear plates 268 are provided near the bottom of the depending sides 208 and 210 on the sides thereof which are apposed to the sides of the walkway 204. Similar wear plates 260 are affixed adjacent the bottom of the depending sides 216 and 218 on the side apposed to the outer walls of the troughs 200 and 202.

While the gasoline engine 10 will ordinarily be operated at a fixed speed by means of a governor, it will be understood that a throttle can be provided for the engine, if desired.

It will thus be seen that there is provided a rugged, narrow gauge, hydraulic or hydrostatic-drive tractor suitable for maneuvering droppings in a hen house where the way between the dropping troughs is narrow and where the load is great. It will be seen that there is provided a tractor having a high degree of versatility and many safety factors, making it suitable for operation by unskilled persons and also a tractor which is highly effective for its intended purpose and avoids the disadvantages of the prior art.

It is to be understood that the invention is not to be limited to the exact details of operation or structure shown and described, as obvious modifications and equivalents will be apparent to one skilled in the art.

I claim:

1. A narrow gauge, hydrostatic-drive tractor comprising an air-cooled prime mover having a rearwardly-projecting drive shaft, a variable-displacement, reversible hydraulic pump having a forwardly-projecting driven shaft coupled with the drive shaft of said prime mover by direct mechanical coupling, a fixed-displacement hydraulic motor having a forwardly-projecting drive shaft and being hydraulically-coupled to said pump by means of a hydraulic circuit in which the output of said pump is supplied directly to the input of said motor and the output of said motor is supplied directly to the input of said pump;

a fan and fan housing at the forward end of said prime mover;

an air conduit means extending vertically-upward from said fan housing for supplying ambient air to cool said prime mover;

cooling means disposed in said air conduit means in heat-exchange with the ambient air drawn in, said cooling means functioning to cool the hydraulic fluid in said hydraulic circuit, and said motor being disposed directly beneath said fan housing with its drive shaft projecting beyond said housing;

differential means having transverse axles and a rearwardly-projecting driven shaft which driven shaft is disposed directly above the drive shaft of said motor and mechanically-coupled thereto; and drive wheels mounted on said axles.

2. A narrow gauge, hydrostatic-drive tractor according to claim 1, in which said tractor has a single guide wheel located beneath said hydraulic pump.

3. A narrow gauge, hydrostatic-drive tractor comprising an air-cooled prime mover having a drive shaft, a variable-displacement, reversible hydraulic pump having a driven shaft coupled with the drive shaft of said prime mover by direct mechanical coupling, a fixed-displacement hydraulic motor having a drive shaft and being hydraulically-coupled to said pump by means of a hydraulic circuit in which the output of said pump is supplied directly to the input of said motor and the output of said motor is supplied directly to the input of said pump;

a fan and fan housing at the end of said prime mover opposite the drive shaft;

an air conduit means extending vertically-upward from said fan housing for supplying ambient air to cool said prime mover;

cooling means disposed in said air conduit means in heat-exchange with the ambient air drawn in, said cooling means functioning to cool the hydraulic fluid in said hydraulic circuit, and said motor being disposed beneath said fan housing with its drive shaft projecting beyond said housing; and, differential means having transverse axles and a driven shaft, which driven shaft is disposed above the drive shaft of said motor and mechanically-coupled thereto, and drive wheels mounted on said axles; in which said prime mover, said pump, and said motor are supported by a frame comprising longitudinal, parallel beams, the front ends of which are supported in and form a unitary part of the housing of said differential and the rear ends of which are supported by a vertically-trunnioned, guide-wheel assembly adapted to rotate about its vertical trunnion to steer the tractor, and in which the diameter of said wheels is substantially the same as the spacing from the outside of one wheel to the outside of the other wheel.

4. The narrow qauge, hydrostatic-drive tractor of claim 3, in which said wheels are separated from each other by less than two widths of said wheels and in which said frame carries a superstructure which extends up over said wheels supporting an operator's seat.

5. The narrow gauge, hydrostatic-drive tractor of claim 4, in which said air conduit means is disposed between said wheels and between said seat and said prime mover.

6. The narrow gauge, hydrostatic-drive tractor of claim 4, in which the overall width of the tractor is not substantially greater than the diameter of said wheels.

7. The narrow gauge, hydrostatic-drive tractor of claim 4, which comprises a vertical steering column adjacent said seat and a roller-chain drive means connecting said steering column with said guide wheel.

8. The narrow gauge, hydrostatic-drive tractor of claim 7, in which said roller-chain drive means comprises two chains, the first of which connects the steering column with a sprocket at the bottom of a vertically-disposed trunnion, and the second of which connects said guide wheel to a sprocket at the top of said vertically-disposed trunnion, said sprockets and said vertically-disposed trunnion being unitary, whereby rotation of the bottom sprocket by said steering column causes rotation of the upper sprocket which, in turn, causes rotation of said guide wheel.

9. The narrow gauge, hydrostatic-drive tractor of claim 8, in which the first of said chains is disposed along the bottom of one side of said frame and extends from said bottom sprocket to and around a plurality of front end sprockets, one of which is unitary with said steering column.

10. The narrow gauge, hydrostatic-drive tractor of claim 9, in which said front end sprockets are mounted on the bottom of a transverse member affixed to the bottom of said forward portion of said superstructure.

11. The narrow gauge, hydrostatic-drive tractor of claim 10, in which said front end sprockets comprise two direct sprockets and two idler sprockets.

12. The narrow gauge, hydrostatic-drive tractor of claim 11, in which the sprocket which is unitary with said steering column is an idler sprocket.

13. The narrow gauge, hydrostatic-drive tractor of claim 11, in which said first chain comprises tightening means for tightening said chain about said sprockets.

14. The narrow gauge, hydrostatic-drive tractor of claim 13, in which said tightening means comprises a turnbuckle in said chain.

15. The narrow gauge, hydrostatic-drive tractor of claim 3, which comprises a transverse guide holder mounted rearward of said guide wheel.

16. The narrow gauge, hydrostatic-drive tractor of claim 15, in which said transverse tool holder is affixed to arms pivotally mounted on a transverse trunnion journaled in said frame forward of said guide wheel, whereby said guide holder can be raised or lowered.

17. The narrow gauge, hydrostatic-drive tractor of claim 16, which comprises means for raising and lowering said guide holder comprising a bell crank unitary with one of said arms, a control lever adjacent said seat, and a connecting rod connecting said bell crank and said lever in such a manner that forward motion of said control lever causes said guide holder to be raised.

18. A narrow gauge, hydrostatic-drive tractor comprising:
   a frame;
   a single guide wheel at the rearward end of said frame;
   a pair of drive wheels at the forward end thereof which are driven through a differential;
   a prime mover in between, having a rearwardly-projecting drive shaft;
   a hydrostatic-drive unit comprising a variable-displacement, reversible hydraulic pump having a forwardly-projecting driven shaft in line with said drive shaft and directly coupled thereto by a mechanical coupling; and,
   a remote fixed-displacement hydraulic motor, hydraulically-coupled with said hydraulic pump and directly mechanically-connected to said differential; said hydraulic pump being disposed closely adjacent to said prime mover and said hydraulic motor being disposed beneath said prime mover with substantially only its drive shaft projecting forwardly beyond the same.

19. A narrow gauge, hydrostatic-drive tractor comprising
   a prime mover having a rearwardly-projecting drive shaft;
   a variable-displacement, reversible hydraulic pump having a forwardly-projecting driven shaft in line with said drive shaft and directly coupled thereto by direct mechanical coupling;
   a fixed-displacement hydraulic motor having a drive shaft and being hydraulically-coupled to said pump by means of a hydraulic circuit in which the output of said pump is supplied directly to the input of said motor and the output of said motor is supplied directly to the input of said pump, said motor being disposed beneath said prime mover with its drive shaft projecting forwardly beyond the same; and,
   differential means having transverse axles having drive wheels mounted thereon and a rearwardly-projecting driven shaft which driven shaft is disposed above the forwardly-projecting drive shaft of said motor and mechanically-coupled thereto.

20. A narrow gauge tractor which comprises drive wheels mounted on a differential driven by a prime mover through a hydrostatic transmission comprising a variable-displacement, reversible hydraulic pump hydraulically-coupled to a hydraulic motor which, in turn, is mechanically-connected to said differential; said prime mover and said transmission being supported by a frame comprising longitudinal, parallel beams, the front ends of which are supported in and form a unitary part of the housing of said differential and the rear ends of which are supported by a vertically-trunnioned, guide-wheel assembly adapted to rotate about its vertical trunnion to steer the tractor, and in which the diameter of said drive wheels is substantially the same as the spacing from the outside of one wheel to the outside of the other wheel.

* * * * *

UNITED STATES PATENT AND TRADEMARK OFFICE
CERTIFICATE OF CORRECTION

PATENT NO. : 4,274,505

DATED : June 23, 1981

INVENTOR(S) : Gale E. Maust

It is certified that error appears in the above—identified patent and that said Letters Patent is hereby corrected as shown below:

Abstract, line 7, after "and" insert -- a --.

Column 8, line 54, "forwrd" should read -- forward --.

Column 10, line 28, "qauge" should read -- gauge --.

Signed and Sealed this

Twenty-fourth Day of November 1981

[SEAL]

Attest:

GERALD J. MOSSINGHOFF

Attesting Officer    Commissioner of Patents and Trademarks